No. 887,696.
PATENTED MAY 12, 1908.
J. L. ROSSON.
VARIABLE FLOAT SHAFT BEARING FOR COTTON SEED LINTING MACHINES.
APPLICATION FILED AUG. 13, 1907.
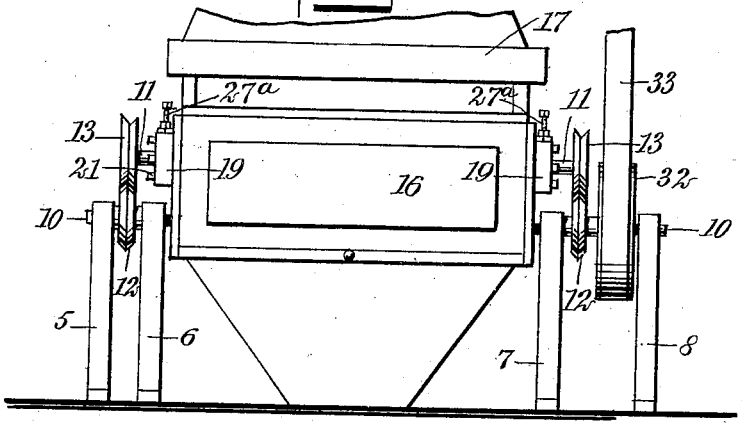
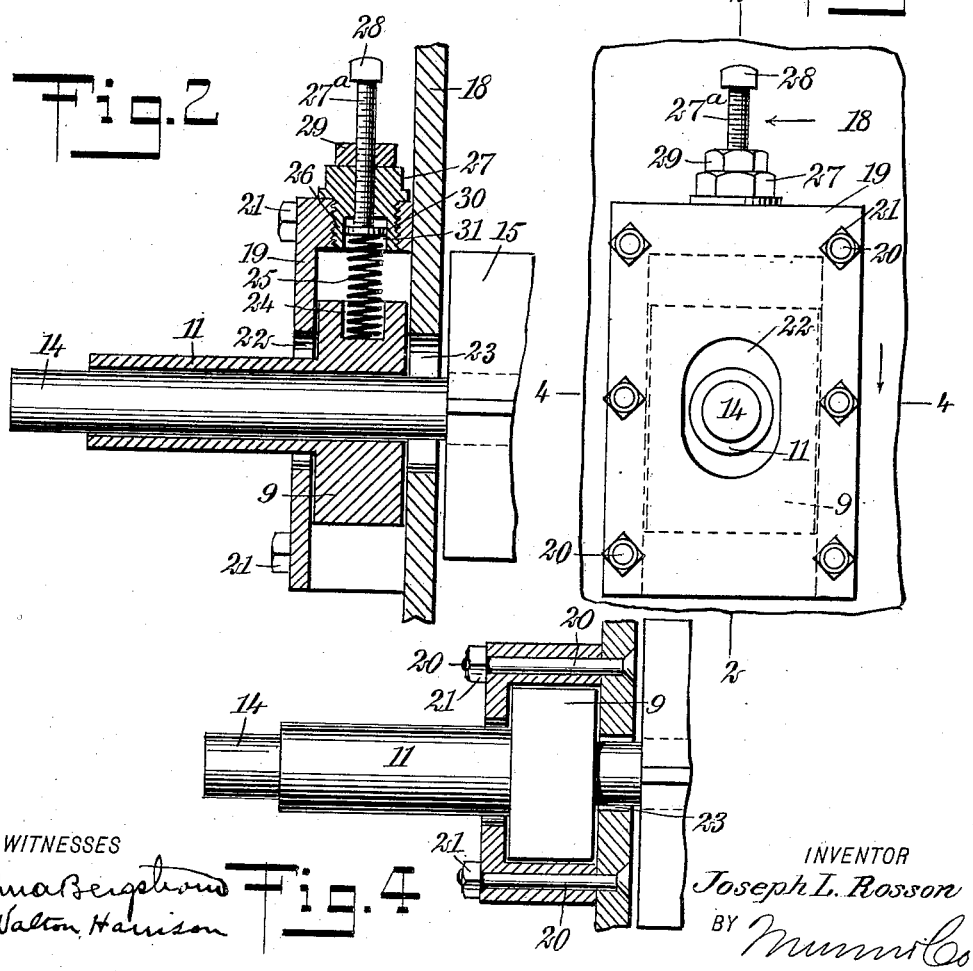
WITNESSES
INVENTOR
Joseph L. Rosson
BY
ATTORNEYS

UNITED STATES PATENT OFFICE.

JOSEPH LINVILLE ROSSON, OF ATHENS, TEXAS, ASSIGNOR TO ROSSON, WOFFORD & CO., OF ATHENS, TEXAS.

VARIABLE FLOAT-SHAFT BEARING FOR COTTON-SEED-LINTING MACHINES.

No. 887,696.  Specification of Letters Patent.  Patented May 12, 1908.

Application filed August 13, 1907. Serial No. 388,288.

*To all whom it may concern:*

Be it known that I, JOSEPH L. ROSSON, a citizen of the United States, and a resident of Athens, in the county of Henderson and State of Texas, have invented a new and Improved Variable Float-Shaft Bearing for Cotton-Seed-Linting Machines, of which the following is a full, clear, and exact description.

My invention relates to cotton seed linting machines, my more particular object being to provide a variable shaft bearing for regulating and maintaining the density of the roll of cotton seed carried by the float shaft of the linting machine.

My invention admits of general use, but for convenience I show it as applied to a cotton seed linting machine of the Carver type.

It will be understood that the Carver linting machine is in general use throughout the Southern States, and its construction is so well known as to need no detail description. Suffice it to say that the machine in question is provided with a saw shaft and with a float drive shaft, the latter being provided with a fluted drum for drifting the cotton seed against the saws of the saw shaft.

My invention relates more particularly to mechanism connected with the float drive shaft for the purpose of rendering it adjustable relative to the means whereby it is actuated.

Reference is to be had to the accompanying drawings forming a part of this specification, in which similar characters of reference indicate corresponding parts in all the figures.

Figure 1 represents a front elevation of the Carver linting machine complete, and showing upon each side of the figure my improved gearing for connecting together the saw shaft and the float drive shaft; Fig. 2 is an enlarged central fragmentary section taken upon the line 2—2 of Fig. 3, looking in the direction of the arrow, and showing one of the spring-controlled bearings engaging the journals of the float drive shaft; Fig. 3 is an enlarged fragmentary side elevation of the machine, showing the mounting for one of the spring-pressed bearings supporting the float drive shaft; and Fig. 4 is a horizontal section upon the line 4—4 of Fig. 3, looking in the direction of the arrow, and showing the slidable mounting for one of the spring-pressed bearings supporting the float drive shaft.

Revolubly mounted upon standards 5, 6, 7 and 8 is a saw shaft 10. Disposed above the shaft 10 are bearings 9, each having integral therewith a bearing sleeve 11.

Mounted upon the saw shaft 10 are friction pulleys 12, the greatest diameter of these pulleys being through their centers, the pulleys having substantially the form of two cone frustums placed base to base. These pulleys engage other friction pulleys 13, the latter having substantially the form of two cone frustums placed apex to apex or, in other words, the smallest diameters of these pulleys are directly through their centers.

The pulleys 13 are mounted rigidly upon the float drive shaft 14, which is revoluble and is provided with wings 15, extending substantially through the entire width of the breast 16 of the linting machine. A feed board is shown at 17, and by its aid the cotton seed are fed into the machine. The wings 15 of the float drive shaft float the seed constantly toward the saw shaft 10.

Mounted upon opposite sides of the breast 16 are stationary heads 18, and mounted upon these heads are frames 19, each of substantially rectangular form. These frames are detachably secured to the heads 18 by bolts 20 and nuts 21. The frames 19 are provided with slots 22, which mate slots 23 in the heads 18. The slots 22 have substantially the form of ellipses.

Each bearing 9 is provided with an aperture 24, in which rests the lower end of a spiral spring 25. A screw plug 26 is fitted into the upper portion of each frame 19 and is provided with an angular portion 27. Extending partially through this screw plug is a threaded bolt $27^a$. Each bolt $27^a$ is encircled by an annular lock nut 29 and has at its upper end an angular head 28. Each bolt $27^a$ is adjustable relatively to the screw plug 26 and when once adjusted may be secured in position by tightening the lock nut 29 upon the angular portion 27 of the screw plug. Each bolt $27^a$ is provided at its lower end with a disk 30, which engages the upper edge of the spiral spring 25, the latter extending upwardly into an aperture 31 in the screw plug 26, as will be understood from Fig. 2.

By adjusting the bolts $27^a$, any desired tension within proper limits may be given to the spiral springs 25, and hence the bearings 9 may be forced downwardly with a proportionate degree of pressure. A pulley 32, mounted rigidly upon the saw shaft 10, is used for the purpose of applying power thereto and a belt 33 is mounted rigidly upon the pulley 32, for turning the same.

My device is used as follows: The tension of the springs 25 being adjusted as above described, the cotton seed is fed into the breast 16 and, power being applied to the pulley 32, the rotation of the saw shaft 10 begins. The float drive shaft, by the action of the springs 25, is pressed constantly toward the saw shaft and the cotton seed is effectively deprived of so much lint as will render the seed in the best condition to be worked up and will produce the greatest quantity of lint obtainable from the seed.

From the above description it will be noted that the float shaft bearings have a variable pressure and are under tension at all times, which holds the surfaces of the friction pulleys together. The slipping of these pulleys is therefore reduced to a minimum. All irregularities of movement and of conformity of the saw shaft are compensated for, and with my improvement it is practicable to maintain the speed of the float-shaft relatively to that of the saw shaft.

With the improvement above described the float shaft bearing under ordinary conditions carries a tight and uniform roll of cotton seed. The float shaft is self-adjusting, in the sense that it requires each pulley to carry a uniform load, thereby reducing the possibility of twisting off the ends of the float shaft or the breaking of the float shaft pulleys or the bending of the float shaft itself, in case the breast of the machine should happen to fall by accident or be dropped from carelessness. In this case the springs over the bearings cushion the shock and prevent damage to pulleys or shaft. Again, the float shaft remains practically at a uniform distance from the saws regardless of the wear of the latter. As the saws wear down, so do the friction pulleys, thus maintaining a substantially constant distance relation between the float shaft and the saw shaft.

Having thus described my invention, I claim as new and desire to secure by Letters Patent:

1. The combination of a casing provided with heads, frames mounted upon said heads, slides mounted within said frames and formed as bearings, each slide being provided with an aperture, a spring mounted within said aperture, a screw plug connected with each frame, a screw extending through said screw plug and engaging said spring for the purpose of forcing said slide in a particular direction, a float shaft supported within the bearings, and a saw shaft disposed adjacent to said float shaft upon the opposite side thereof from said spring.

2. The combination of a casing provided with heads, frames mounted rigidly upon said heads, said frames and said heads being provided with slots registering with each other, a hollow screw plug secured within each of said frames and threaded internally, a screw extending through each screw plug, a locking nut mounted upon said screw and adapted to jam against said screw plug for the purpose of holding said screw in a predetermined position, a spring engaging said screw, a slide mounted between each frame and the head adjacent thereto, said slide being provided with an aperture, said spring entering said aperture, each slide being provided with a portion serving as a bearing, a float shaft provided with a portion engaging said bearing, said float shaft extending through said slots, a saw shaft disposed adjacent to said float shaft and located upon the side thereof opposite said spring.

In testimony whereof I have signed my name to this specification in the presence of two subscribing witnesses.

JOS. LINVILLE ROSSON.

Witnesses:
 A. S. FERRELL,
 J. F. NEFF.